(12) United States Patent  
Barfurth et al.

(10) Patent No.: US 7,125,922 B2
(45) Date of Patent: *Oct. 24, 2006

(54) ALKOXYSILANE DRYER FOR CROSSLINKABLE POLYMER COMPOUNDS

(75) Inventors: Dieter Barfurth, Rheinfelden (DE); Helmut Mack, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 319 days.

This patent is subject to a terminal disclaimer.

(21) Appl. No.: 10/649,722

(22) Filed: Aug. 28, 2003

(65) Prior Publication Data

US 2004/0054048 A1 Mar. 18, 2004

(30) Foreign Application Priority Data

Aug. 30, 2002 (DE) ............................... 102 40 756

(51) Int. Cl.
*B60C 1/00* (2006.01)

(52) U.S. Cl. ........................... 524/265; 524/266

(58) Field of Classification Search ............... 524/265, 524/266

See application file for complete search history.

(56) References Cited

U.S. PATENT DOCUMENTS

| 4,172,189 | A |   | 10/1979 | Muller et al. |   |
|---|---|---|---|---|---|
| 5,808,125 | A |   | 9/1998 | Standke et al. |   |
| 5,849,942 | A |   | 12/1998 | Standke et al. |   |
| 5,863,509 | A |   | 1/1999 | Standke et al. |   |
| 5,885,341 | A |   | 3/1999 | Standke et al. |   |
| 5,895,794 | A | * | 4/1999 | Berg et al. ................. | 523/217 |
| 6,054,601 | A |   | 4/2000 | Standke et al. |   |
| 6,100,418 | A |   | 8/2000 | Standke et al. |   |
| 6,133,466 | A | * | 10/2000 | Edelmann et al. .......... | 556/440 |
| 6,177,584 | B1 |   | 1/2001 | Loewenberg et al. |   |
| 6,228,936 | B1 |   | 5/2001 | Standke et al. |   |
| 6,239,194 | B1 |   | 5/2001 | Standke et al. |   |
| 6,251,989 | B1 |   | 6/2001 | Edelmann et al. |   |
| 6,255,513 | B1 |   | 7/2001 | Standke et al. |   |
| 6,288,256 | B1 |   | 9/2001 | Standke et al. |   |
| 6,361,871 | B1 |   | 3/2002 | Jenkner et al. |   |
| 6,395,858 | B1 | * | 5/2002 | Mack et al. ................. | 528/38 |
| 6,403,228 | B1 |   | 6/2002 | Mack et al. |   |
| 6,444,315 | B1 |   | 9/2002 | Barfurth et al. |   |
| 6,500,883 | B1 |   | 12/2002 | Mack et al. |   |
| 6,528,585 | B1 |   | 3/2003 | Standke et al. |   |
| 6,534,667 | B1 |   | 3/2003 | Standke et al. |   |
| 6,780,955 | B1 | * | 8/2004 | Barfurth et al. ............. | 528/12 |

FOREIGN PATENT DOCUMENTS

| DE | 196 24 032 A1 | 12/1997 |
|---|---|---|
| DE | 100 56 343 A1 | 5/2002 |
| DE | 100 56 344 A1 | 5/2002 |
| EP | 0 007 765 B1 | 2/1980 |
| EP | 0 245 938 A2 | 11/1987 |
| EP | 0 518 057 A1 | 12/1992 |
| EP | 0 814 110 A1 | 12/1997 |
| WO | 90/07542 | 7/1990 |

* cited by examiner

*Primary Examiner*—Peter D. Mulcahy
(74) *Attorney, Agent, or Firm*—Oblon, Spivak, McClelland, Maier & Neustadt, P.C.

(57) ABSTRACT

A composition containing an alkoxysiloxane including a catenate alkoxysilane of formula I and/or a cyclic siloxane of formula II, and a crosslinkable polymer compound and the use thereof as a water scavenger, dryer or precuring retarder $$R_3Si-O-[SiR_2-O-]_m SiR_3 \qquad (I)$$

$$\left[ O-SiR_2-[O-SiR_2]_n \right] \qquad (II)$$

17 Claims, No Drawings

ALKOXYSILANE DRYER FOR CROSSLINKABLE POLYMER COMPOUNDS

BACKGROUND OF THE INVENTION

1. Field of the Invention

The present invention relates to a novel composition which can be used as a water scavenger, dryer, and premature-crosslinking preventative ("precuring retarder") in crosslinkable polymer compounds.

2. Discussion of the Background

The use of monomeric alkyltrialkoxysilanes as "precuring retarders" in ethylenevinyltrimethoxysilane copolymers is known (WO 90/07542, EP 0 007 765 B1).

In adhesives and sealants and also paints and varnishes based on silane-terminated polyurethanes, MS polymer or EPION®, vinyltrimethoxysilane (VTMO) is used as a water scavenger. The presence of a silane provides storage stability. Moreover, VTMO prevents skinning during production of adhesives and sealants. The water scavenger, dryer or "precuring retarder" is normally added during preparation of the copolymer or terpolymer, in the course of compounding or in the course of formulation. Such preparations are generally crosslinkable and are referred to herein as crosslinkable polymer compositions.

A disadvantage of VTMO-containing compositions is that, owing to the volatility of the silane, the amount of the silane component which must be present to achieve the desired effect is greater than that actually necessary for drying, water absorption, and/or retarding precure.

SUMMARY OF THE INVENTION

Accordingly it is an object of the present invention to provide a composition and method for reducing the loss of water scavenger, dryer or "precuring retarder" in a crosslinkable polymer composition.

This object is achieved in accordance with the invention as described herein and specified in the claims.

Surprisingly it has been found that alkoxysiloxanes can be used advantageously as water scavengers, dryers, and "precuring retarders" in crosslinkable polymer compositions with no loss of water scavenger, dryer or "precuring retarder" through evaporation.

Thus it has been found that, as an alkoxysiloxane composition, mixtures of catenate and cyclic alkoxysiloxanes in particular can be used as water scavengers, dryers, and "precuring retarders".

DESCRIPTION OF THE PREFERRED EMBODIMENTS

Preferred alkoxysiloxanes, particularly mixtures of catenate and cyclic organoalkoxysiloxanes, are generally of low viscosity and low volatility and are more reactive with water than the conventional monomeric silanes employed in state of the art polymer compositions.

The present invention accordingly provides a composition which comprises alkoxysiloxanes and functions as a water scavenger, dryer or "precuring retarder" in crosslinkable polymer compositions.

Particularly suitable alkoxysiloxanes and their preparation are disclosed in EP 0 518 057 A1, EP 0 814 110 A1, and German Patent Applications 100 56 344 and 100 56 343, and also the parallel German application whose title translates as "Mixture of catenate and cyclic siloxane oligomers, its preparation and use". The entire contents of each of the aforementioned documents is incorporated herein by reference. On hydrolysis with water, with elimination of the corresponding alcohol, these siloxanes may also contain hydroxyl groups.

A composition of the invention may in particular comprise catenate siloxanes of the general formula I

and cyclic siloxanes of the general formula II

in which m is an integer from 0 to 40 and n is an integer from 2 to 40, groups R are identical or different, R is a hydrocarbon-functional group selected from vinyl, allyl, phenyl, n-, iso-, and cyclo-alkyl having from 1 to 18 carbon atoms, preferably vinyl, n-propyl, isopropyl, n-butyl, isobutyl, n-octyl, iso-octyl or hexadecyl, or is an alkoxy group, preferably methoxy or ethoxy, and there is not more than one hydrocarbon functional group per silicon atom.

In compositions of the invention, n-propylalkoxysiloxanes and vinylalkoxysiloxanes are particularly preferred.

By way of example, the alkoxysiloxanes may be prepared by selective condensation of vinyltrimethoxysilane, vinyltriethoxysilane, propyltrimethoxysilane, propyltriethoxysilane or their corresponding organochlorosilanes in the presence of an alcohol, or by selective cocondensation of vinyltriethoxysilane with tetraethoxysilane or selective cocondensation of vinyltrimethoxysilane with tetramethoxysilane, to name but a few examples. Where appropriate, a hydrolysis catalyst and/or condensation catalyst may be used when preparing the alkoxysiloxanes. Moreover, the present composition may be prepared by selective blending of mixtures of alkoxysiloxanes.

As a further constituent, the compositions of the invention may comprise monomeric alkoxysilanes, such as isobutyltriethoxysilane or hexadecyltrimethoxysilane, for example.

The use of a composition comprising alkoxysiloxanes in crosslinkable polymer compositions is of advantage on account of the fact that the alkoxysiloxanes used in accordance with the invention are much less volatile than, for example, monomeric vinyltrimethoxysilane and, furthermore, the amount needed to achieve an at least comparable effect is lower. The effect is generally the binding of water and moisture with elimination of an alcohol.

By means of the invention it is also possible to ensure the storage stability and hence the processing properties of crosslinkable polymer compositions in a way which is advantageous, simple and cost-effective, for a prolonged period of time. Moreover, the invention is environmentally friendly, since the emission of volatile organic compounds (VOCs) can be lessened.

The present invention likewise provides for the use of a composition comprising alkoxysiloxanes as a water scavenger, dryer and/or "precuring retarder" especially in crosslinkable polymer compositions.

Accordingly, the present invention further provides crosslinkable polymer compositions which comprise alkoxysiloxanes as water scavengers, dryers or "precuring retarders", i.e., polymer compounds to which a composition of the invention is added as a water scavenger, dryer or "precuring retarder".

Polymer compositions of the invention which comprise alkoxysiloxanes as water scavengers, dryers and/or "precuring retarders" are based preferably on ethylene-vinyltrimethoxysilane or ethylene-vinyltriethoxysilane copolymers, for example VISICO® or SI-LINK®, which are obtainable by free-radical copolymerization of ethylene and vinylsilanes and in which the silane units are randomly distributed, or ethylene-alkylene copolymers, especially those having from 3 to 8 carbon atoms per alkene unit, an example being ENGAGE®, onto which vinyltrimethoxysilane or vinyltriethoxysilane has been grafted (SIOPLAS® process), or vinyltrimethoxysilane or vinyltriethoxysilane terpolymers, formed starting, for example, from ethylene and n-octene with metallocene catalysis, or graft polymers of ethylene and acryloyloxysilane/methacryloyloxysilane obtained by the SIOPLAS® process, e.g., with acryloyloxypropyltrimethoxysilane, acryloyloxypropyltriethoxysilane, methacryloyloxypropyltrimethoxysilane or methacryloyloxypropyltriethoxysilane, or silane-terminated polyurethanes having (R'O)$_3$Si or (R'O)$_2$SiMe end groups and a polyol/isocyanate framework, where Me is a methyl group and R' is, for example, a linear, branched or cyclic alkyl group having from 1 to 16 carbon atoms, or MS-POLYMER®, a silane-terminated polyether based on polypropylene oxide and/or polybutylene oxide and (R'O)$_3$Si and/or (R'O)$_2$SiMe end groups, where Me and R' are defined above, or EPION®, a polyether based on polybutylene oxide and (R'O)$_3$Si or (R'O)$_2$SiMe end groups, where Me and R' are defined above, or crosslinkable HFFR (high filled flame retardant) compounds, i.e., filled flame-retardant polymers, such as EVA, polyethylene or ethylene-alkylene copolymers which are grafted with a silane, vinyltrimethoxysilane or vinyltriethoxysilane or 3-methacryloyloxypropyltrimethoxysilane, for example, or a corresponding acryloylsilane, for example, and are filled with filler, aluminum hydroxide (ATH) or magnesium hydroxide (MD), for example, and/or with intumescent fillers, such as ammonium polyphosphates, zinc hydroxystannates, melamine phosphates, and melamine cyanurates, to name but a few examples.

Generally speaking, a polymer composition of the invention can be prepared by first mixing the crosslinkable polymer with a filler and adding the composition of the invention during formulation/compounding, in a single quantity or in portions, at different points in formulating/compounding, suitably in the absence of moisture or under dried inert gas, completing the polymer composition by adding crosslinker, adhesion promoter, and catalyst, and discharging it. In this way it is possible advantageously to obtain a ready-to-use product having excellent storage and application properties. The polymer composition of the invention may also be prepared by mixing the components in any order. For example, an alkoxysilane mixture of the invention can be added directly to the crosslinkable polymer before a filler is added or the crosslinkable polymer may be added to the alkoxysilane with or without the presence of other ingredients.

In use, polymer compounds of the invention are normally crosslinked in the presence of a crosslinking catalyst, preferably a tin-based catalyst such as bis(n-butyl)tin diketonate (DBTAA, METATIN® 740), for example, and with addition of water or by ingress of moisture.

The present invention is illustrated by the following examples which are not intended to further limit the invention.

EXAMPLE 1

Comparing the volatility of the dryers

Table 1 compares the volatility of a number of dryers. The parameter measured was the weight loss on storage of the dryers at 23° C. and 60% relative humidity with a contact area with the atmosphere of approximately 300 cm$^2$. The figure reported (%) is derived from the mass remaining after storage relative to the initial mass.

Table 1 describes the substantially lower volatility of the vinylalkoxysiloxanes of the invention as compared with vinyltrimethoxysilane.

TABLE 1

| Storage period (h) | Vinyltrimethoxysilane[1] (%) | Vinylmethoxysiloxanes[2] (%) | Vinylethoxysiloxanes[3] (%) |
|---|---|---|---|
| 0 | 100 | 100 | 100 |
| 1 | 0.5 | 98.5 | 99.5 |
| 2 | 0.3 | 97.0 | 98.8 |
| 4 | 0.2 | 96.0 | 97.2 |
| 8 | 0.1 | 94.0 | 96.6 |
| 24 | 0.05 | 87.5 | 91.5 |
| 48 | <0.01 | 86.9 | 90.9 |

[1] Standard dryer as comparative example
[2] Alkoxysiloxane mixture from EP 0 518 057 A1 (Example 6)
[3] This alkoxysiloxane may be prepared as follows: a 2000 ml jacketed three-necked flask equipped with water condenser, stirrer, thermometer and dropping funnel is charged under nitrogen with 807.5 g (5.0 mol) of vinyltrichlorosilane. Via the dropping funnel, whose inlet tube ends below the surface of the chlorosilane liquid, first 575.0 g of ethanol (12.5 mol, corresponding to 60% of the amount to be added) are metered in at room temperature over the course of 2 to 3 hours. The reaction mixture immediately gives off hydrogen chloride, which is taken off by way of the condenser and absorbed in water in a receiver vessel. The temperature of the reaction mixture climbs to about 35 to 40° C. In the next stage, an ethanol/water mixture composed of 391.0 g of ethanol (8.5 mol, 40% of the amount to be added) and 72.0 g of water (4.0 mol) is metered in at a rate such that the temperature of the reaction mixture reaches about 90 to 95° C. within 3 or 4 hours. Following addition of the ethanol/water mixture, the contents of the flask are heated at reflux for 60 minutes. The course of the reaction is monitored by means of GC, by determining the vinyltrichlorosilane content. From the crude product obtained in accordance with the above procedure, which contains excess ethanol and residues of hydrogen chloride which has been formed, an ethanol/hydrogen chloride mixture is subsequently separated off by distillation under atmospheric pressure. The temperature of the batch climbs to around 150 to 155° C. during distillation. After the reaction mixture has cooled to about 100° C., the acidity of the product, or chloride content, is measured. Based on the chloride figure obtained, a stoichiometric amount of sodium ethoxide (in the form of a 30% strength ethanolic solution) is added and the mixture is stirred for 15 minutes. Then the chloride content is measured again and, where appropriate, further ethanolic sodium hydroxide is added, followed again by stirring for 15 minutes. If the chloride content is less than 10 mg/kg, the product is cooled to room temperature and the remaining ethanol is removed by vacuum distillation (to 30 hPa and a product temperature of 100° C.).

As the final workstep, the sodium chloride produced on neutralization with sodium ethoxide is removed from the product on a filter.

This gives 619.3 g (94.7% of theory) of vinyl- and ethoxy-functional oligosiloxane having the following characteristics: SiO$_2$ content 45.2% (by mass), ethanol<0.1% (by mass), color number: <5 mg Pt—Co/l.

EXAMPLES 2 and 3

General method for preparing and testing crosslinkable polymer compounds

The crosslinkable polymer compositions were produced using a planetary mixer by mixing the components in 1 liter cans. First of all the plasticizer was mixed with a third of the alkoxysilane (dryer, water scavenger or premature-crosslinking preventative) and with an amount of filler corresponding to the amount of plasticizer (the filler is dried beforehand at 110° C. in a forced-air oven) with intensive stirring. This was followed by the addition of a polymer binder (see the following examples), plus a further third of the alkoxysilane. The remainder of the filler was then added in portions and the compound was homogenized while heated at 80° C. Operation then continued under vacuum (<5 hPa) in order to remove volatile constituents. After the composition had been cooled to about 50° C., the final third of alkoxysilane was added and a silane adhesion promoter and a crosslinking catalyst were incorporated. A further vacuum treatment followed in order to remove bubbles. The crosslinkable polymer composition obtained in this way was discharged from the mixing can into cartridges (standard containers for sealant, capacity 300 ml).

The processability and storage stability of the crosslinkable polymer compounds were tested by the following method:

After predetermined periods of time, e.g., after 1 day, 1-2-3 weeks, and 1-2-3-6 months, the polymer composition was expressed from a cartridge for 15 seconds. The expressing pressure was the same in each case, and afterwards the composition expressed was weighed. In addition to storage at room temperature, the cartridges were also stored at 50° C. and the expression test was carried out after storage for from 1 to 8 weeks.

EXAMPLE 2

Crosslinkable polymer compound containing a silane-terminated polyether (MS-Polymer®)

In accordance with the general method described above,

| | | |
|---|---|---|
| 1,000 g | MS-Polymer ® (mixture of S203H and S303H, KANEKA) | |
| 2,500 g | Carbital ® 110S (ground calcium carbonate coated with stearic acid; IMERYS) | |
| 700 g | plasticizer (diisodecyl phthalate DIDP) | |
| 200 g | rheology modifier (CRAYVALLAC ® SL) | |
| 10 g | crosslinking catalyst (METATIN ® 740) | |
| 30 g | dryer (see Table 2) | |
| 20 g | silane adhesion promoter (DYNASYLAN ® DAMO-T) | | were processed to form a crosslinkable polymer composition and discharged into cartridges.

The results of testing for processability and storage stability are given in Table 2:

TABLE 2

| | | Amount expressed (g/15 sec); dryer | |
|---|---|---|---|
| Storage period H | Storage temperature (° C.) | Vinyltrimethoxy-silane[1] | Vinylmethoxy-siloxane[2] |
| 1 week | 23 | 62 | 59 |
| 1 month | 23 | 61 | 57 |
| 2 months | 23 | 38 | 44 |

TABLE 2-continued

| | | Amount expressed (g/15 sec); dryer | |
|---|---|---|---|
| Storage period H | Storage temperature (° C.) | Vinyltrimethoxy-silane[1] | Vinylmethoxy-siloxane[2] |
| 6 months | 23 | 27 | 35 |
| 1 week | 50 | 54 | 55 |
| 2 weeks | 50 | 35 | 43 |
| 8 weeks | 50 | 26 | 32 |

[1]and
[2]cf. footnotes to Table 1

EXAMPLE 3

Crosslinkable polymer composition containing a silane-terminated polyurethane

In accordance with the general method described above,

| | | |
|---|---|---|
| 1,000 g | silane-terminated polyurethane (XP-55, Hansechemie) | |
| 1,300 g | SOCAL ® 312 (precipitated calcium carbonate coated with stearic acid) | |
| 400 g | plasticizer (diisodecyl phthalate DIDP) | |
| 30 g | rheology modifier (AEROSIL ® R974) | |
| 0.5 g | crosslinking catalyst (METATIN ® 740) | |
| 40 g | dryer (see Table 3) | |
| 30 g | silane adhesion promoter (DYNASYLAN ® DAMO-T) | | were processed to a crosslinkable polymer composition and discharged into cartridges.

The results of testing for processability and storage stability are given in Table 3:

TABLE 3

| | | Amount expressed (g/15 sec); dryer | |
|---|---|---|---|
| Storage period H | Storage temperature (° C.) | Vinyltrimethoxy-silane[1] | Vinylmethoxy-siloxane[2] |
| 1 week | 23 | 60 | 62 |
| 1 month | 23 | 57 | 57 |
| 2 months | 23 | 35 | 42 |
| 6 months | 23 | 28 | 35 |
| 1 week | 50 | 55 | 54 |
| 2 weeks | 50 | 37 | 40 |
| 8 weeks | 50 | 26 | 33 |

[1]and
[2]cf. footnotes to Table 1

EXAMPLE 4

Crosslinkable polymer compound based on ethylene-vinyltrimethoxysilane copolymer:

A commercial silane-crosslinking polyethylene copolymer and 1% by weight of the dryer (alkoxysilane of the invention) specified in Table 4 were used to produce, by extrusion, a modified polymer compound which was subjected to the following test:

The modified polymer compound was stored in open vessels at 60° C. and the loss of Si dryer was determined by measuring the Si content after predetermined times; cf. Table 4.

TABLE 4

| Storage period (h) | Relative silicon content following storage, as % of the initial amount of Si dryer | | |
|---|---|---|---|
| | Vinyltrimethoxy-silane[1)] | Octylethoxy-siloxane[4)] | Vinylsilane oligomer[3)] |
| 5 | 55 | 98 | >99 |
| 10 | 25 | 95 | 97 |
| 15 | 14 | 93 | 95 |
| 20 | 9 | 89 | 93 |
| 30 | 4 | 86 | 90 |
| 40 | 2 | 82 | 88 |
| 50 | <1 | 79 | 86 |

[4)]Dryer from EP 0 814 110 A1 (Example)
[1)]and
[3)]dryers, cf. footnotes to Table 1.

German Application 10240756B filed on Aug. 30, 2002 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A composition, comprising:
one or more alkoxysiloxane compound which is selected from the group consisting of catenate alkoxysiloxane compounds of fomula I

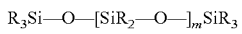    (I)

and cyclic siloxane compounds of formula II

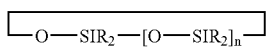    (II)

wherein m is an integer ranging from 0 to 40 and n is an integer from 2 to 40, groups R are identical or different and each is a hydrocarbon-functional group selected from the group consisting of vinyl, allyl, phenyl, n-alkyl, iso-alkyl, and cyclo-alkyl having from 1 to 18 carbon atoms or is an alkoxy group, wherein not more than one hydrocarbon-functional group is attached to each silicon atom, and a crosslinkable polymer.

2. The composition as claimed in claim 1, which further comprises at least one monomeric alkoxysilane.

3. The composition as claimed in claim 2, wherein the monomeric alkoxysilane is at least one alkoxysilane selected from the group consisting of isobutyltriethoxysilane and hexadecyltrimethoxysilane.

4. The composition as claimed in claim 1, wherein the crosslinkable polymer is selected from the group consisting of random
ethylene/vinyltrimethoxysilane copolymer or ethylene/vinyltriethoxysilane copolymer,
ethylene/alkylene copolymer having vinyltrimethoxysilane or vinyltriethoxysilane grafted thereon,
ethylene/n-octene/vinyltrimethoxysilane terpolymer or ethylene/n-octene/vinyltriethoxysilane terpolymers,
ethylene/(meth)acryloyloxytrialkoxysilane copolymers,
silane-terminated polyurethane,
a silane-terminated polyether,
a polyether based on polybutylene oxide, and
crosslinkable filled flame-retardant compound.

5. The composition as claimed in claim 1, wherein the composition comprises at least one of an n-propylalkoxysiloxane or a vinylalkoxysiloxane.

6. The composition as claimed in claim 1, wherein the alkoxysiloxane composition is prepared by the condensation of an alkyltrialkoxysilane or aryltrialkoxysilane in the presence of an alcohol.

7. The composition as claimed in claim 1, wherein at least one methoxy group or ethoxy group is bonded to each silicon atom in formula I and formula II.

8. The composition as claimed in claim 1, which comprises a catenate alkoxysiloxane and a cyclic siloxane.

9. The composition as claimed in claim 1, comprising vinyltrimethoxysiloxane.

10. The composition as claimed in claim 1, further comprising at least one of a filler, a crosslinker, an adhesion promoter or a catalyst.

11. The composition as claimed in claim 1, comprising 100 parts of the crosslinkable polymer, 250 parts of a filler, 70 parts of a plasticizer, 20 parts of a rheology modifier, 1 part of a crosslinking catalyst, 3 parts of one or more alkoxysiloxanes and 2 parts of a silane adhesion promoter.

12. The composition as claimed in claim 1, wherein the alkoxysiloxane has a volatility less than the volatility of vinyltrimethoxysilane.

13. The composition as claimed in claim 1, further comprising vinyltrimethoxysilane.

14. A crosslinked polymer composition obtained by crosslinking the composition of claim 1.

15. In a composition comprising at least one crosslinkable polymer and at least one crosslinking catalyst, wherein the improvement comprises:
an alkoxysilane mixture comprising one or more catenate alkoxysiloxane compounds of formula I

    (I)

and one or more cyclic siloxane compounds of formula II

    (II)

wherein m is an integer ranging from 0 to 40 and n is an integer ranging from 2 to 40, groups R are identical or different and each is a hydrocarbon-functional group selected from the group consisting of vinyl, allyl, phenyl, n-alkyl, iso-alkyl, and cyclo-alkyl having from 1 to 18 carbon atoms or is an alkoxy group, wherein not more than one hydrocarbon-functional group is attached to each silicon atom, each being present in an amount effective for drying or retarding procuring in said composition.

16. A method for preparing the composition of claim 1, comprising:
mixing one or more catenate alkoxysiloxane compounds of formula I

    (I)

and one or more cyclic siloxane compounds of formula II

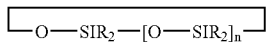 (II)

wherein m is an integer ranging from 0 to 40 and n is an integer ranging from 2 to 40, groups R are identical or different and each is a hydrocarbon-functional group selected from the group consisting of vinyl, allyl, phenyl, n-alkyl, iso-alkyl, and cyclo-alkyl having from 1 to 18 carbon atoms or is an alkoxy group, wherein not more than one hydrocarbon-functional group is attached to each silicon atom, with one or more crosslinkable polymers.

17. A method, comprising:
crosslinking the crosslinkable polymer composition of claim 1 in the presence of a catalyst.

* * * * *